(12) United States Patent  (10) Patent No.: US 9,120,195 B2
Veldman  (45) Date of Patent: Sep. 1, 2015

(54) WHEEL ASSEMBLY AND METHOD FOR MAKING SAME

(75) Inventor: Robert Veldman, Brighton, MI (US)

(73) Assignee: DIVERSIFIED MACHINE, INC., Wixom, MI (US)

( * ) Notice: Subject to any disclaimer, the term of this patent is extended or adjusted under 35 U.S.C. 154(b) by 640 days.

(21) Appl. No.: 12/709,986

(22) Filed: Feb. 22, 2010

(65) Prior Publication Data

US 2010/0257737 A1    Oct. 14, 2010

Related U.S. Application Data

(60) Provisional application No. 61/208,102, filed on Feb. 20, 2009.

(51) Int. Cl.
*B24B 5/44* (2006.01)
*B24B 1/04* (2006.01)
*B24B 1/00* (2006.01)

(52) U.S. Cl.
CPC ... *B24B 5/44* (2013.01); *B24B 1/00* (2013.01); *Y10T 29/49496* (2015.01)

(58) Field of Classification Search
CPC ............................ Y10T 29/49496; B24B 5/44
USPC ................. 29/894.3, 894.32, 525.01, 525.02, 29/525.11; 361/105.1; 384/545, 544; 451/51, 290
See application file for complete search history.

(56) References Cited

U.S. PATENT DOCUMENTS

| | | | |
|---|---|---|---|
| 1,605,173 A | 11/1923 | Cole | |
| 2,891,435 A | 6/1959 | Billeter | |
| 3,044,791 A | 7/1962 | Nicosia et al. | |
| 3,526,058 A | 9/1970 | Price | |
| 4,042,346 A | 8/1977 | Sioui et al. | |
| 4,456,308 A | 6/1984 | Opel et al. | |
| 4,699,431 A | 10/1987 | Daberroe | |
| 4,792,020 A | 12/1988 | Okumura et al. | |
| 4,864,231 A | 9/1989 | Okumura et al. | |
| 4,881,842 A | 11/1989 | Farrell | |
| 4,918,872 A * | 4/1990 | Sato et al. | 451/548 |
| 4,949,511 A * | 8/1990 | Endo et al. | 51/295 |
| 5,090,851 A | 2/1992 | White | |

(Continued)

FOREIGN PATENT DOCUMENTS

| DE | 3900356 A1 | 7/1990 |
|---|---|---|
| EP | 0023881 A2 | 2/1981 |

(Continued)

OTHER PUBLICATIONS

International Search Report/Written Opinion, PCT/US2010/024924, dated Apr. 15, 2010 (Published as WO2010/096765 on Aug. 26, 2010.

(Continued)

*Primary Examiner* — Peter DungBa Vo
*Assistant Examiner* — Kaying Kue
(74) *Attorney, Agent, or Firm* — The Dobrusin Law Firm, P.C.

(57) ABSTRACT

The present invention provides an apparatus and a method for manufacturing a wheel hub to reduce lateral run-out. Specifically, the present invention provides an apparatus and a method for machining the inner and outer surfaces of the wheel hub after the wheel bolts and bearing have been attached to the wheel hub. A grind wheel is used to finish an inner flange portion and outer flange portion of the wheel hub.

20 Claims, 6 Drawing Sheets

(56) References Cited

U.S. PATENT DOCUMENTS

| | | | |
|---|---|---|---|
| 5,108,156 A | 4/1992 | Bell | |
| 5,158,739 A | 10/1992 | Gente et al. | |
| 5,209,701 A | 5/1993 | Ishikawa et al. | |
| 5,257,561 A | 11/1993 | Folta | |
| 5,381,630 A * | 1/1995 | Kinner | 451/63 |
| 5,398,999 A | 3/1995 | Last | |
| 5,430,926 A | 7/1995 | Hartford | |
| 5,443,316 A | 8/1995 | Deane et al. | |
| 5,464,233 A | 11/1995 | Hanai | |
| 5,490,720 A | 2/1996 | Archibald | |
| 5,653,153 A | 8/1997 | Greenwald | |
| 5,680,801 A | 10/1997 | Keller | |
| 5,791,976 A * | 8/1998 | Honda | 451/288 |
| 5,884,980 A | 3/1999 | Visser et al. | |
| 5,885,137 A * | 3/1999 | Ploessl | 451/56 |
| 5,899,305 A | 5/1999 | Austin et al. | |
| 5,915,502 A | 6/1999 | Rapisardi et al. | |
| 5,937,499 A | 8/1999 | Austin et al. | |
| 6,004,196 A * | 12/1999 | Doan et al. | 451/443 |
| 6,071,180 A * | 6/2000 | Becker | 451/63 |
| 6,139,405 A * | 10/2000 | Becker | 451/63 |
| 6,158,124 A | 12/2000 | Austin | |
| 6,212,981 B1 * | 4/2001 | Brinker et al. | 82/1.11 |
| 6,247,219 B1 | 6/2001 | Austin et al. | |
| 6,364,426 B1 | 4/2002 | Horne et al. | |
| 6,415,508 B1 * | 7/2002 | Laps | 29/894.362 |
| 6,450,584 B2 | 9/2002 | Brinker | |
| 6,485,109 B2 | 11/2002 | Brinker et al. | |
| 6,634,266 B2 | 10/2003 | Brinker | |
| 6,702,398 B2 * | 3/2004 | Laps | 301/105.1 |
| 6,708,589 B2 | 3/2004 | Brinker | |
| 6,880,898 B2 * | 4/2005 | Nakamura et al. | 301/105.1 |
| 7,024,751 B2 | 4/2006 | Sefcik | |
| 7,047,645 B2 * | 5/2006 | Kaneko | 29/894.362 |
| RE39,195 E | 7/2006 | Doan et al. | 451/443 |
| 7,083,504 B2 * | 8/2006 | Fukao et al. | 451/52 |
| 7,226,344 B2 * | 6/2007 | Fukao et al. | 451/246 |
| 7,270,037 B2 * | 9/2007 | Newell et al. | 82/112 |
| 7,296,332 B2 | 11/2007 | Brinker | |
| 7,337,699 B2 * | 3/2008 | Newell et al. | 82/112 |
| 7,650,696 B2 * | 1/2010 | Sensui et al. | 29/894.362 |
| 7,681,478 B2 * | 3/2010 | Gerdes et al. | 82/1.11 |
| 7,716,833 B2 | 5/2010 | Brinker | |
| 8,151,434 B2 * | 4/2012 | Fukao | 29/557 |
| 2001/0029153 A1 * | 10/2001 | Mori et al. | 451/49 |
| 2001/0045770 A1 | 11/2001 | Brinker et al. | |
| 2001/0048242 A1 | 12/2001 | Brinker et al. | |
| 2004/0046440 A1 | 3/2004 | Brinker et al. | |
| 2005/0206221 A1 * | 9/2005 | Brinker et al. | 301/105.1 |
| 2008/0129106 A1 * | 6/2008 | Brinker et al. | 301/105.1 |
| 2009/0105031 A1 | 4/2009 | Sefeik et al. | |
| 2010/0236069 A1 | 9/2010 | Brinker et al. | |

FOREIGN PATENT DOCUMENTS

| | | |
|---|---|---|
| EP | 0065127 A2 | 11/1982 |
| GB | 2080745 A | 2/1982 |
| GB | 2198995 A | 6/1988 |
| JP | 64-028056 A | 1/1989 |
| JP | 3091990 A | 6/1995 |
| JP | 7164809 A | 6/1995 |
| WO | 2010/096765 A1 | 8/2010 |

OTHER PUBLICATIONS

Corresponding U.S. Appl. No. 09/414,113, filed Oct. 8, 1999 now patented as 6,485,109.

Corresponding U.S. Appl. No. 09/899,772, filed Jul. 5, 2001 now patented as 6,450,584.

Corresponding U.S. Appl. No. 10/016,589, filed Dec. 14, 2001 now patented as 6,634,266.

Corresponding U.S. Appl. No. 10/658,861, filed Sep. 9, 2003 (Abandoned) published as 2004/0046440 dated Mar. 11, 2004.

Corresponding U.S. Appl. No. 11/012,074, filed Dec. 14, 2004 (Abandoned) published as 2005/0206221 dated Sep. 22, 2005.

Corresponding U.S. Appl. No. 11/998,865, filed Nov. 30, 2007 now patented as 7,716,833.

Corresponding U.S. Appl. No. 11/413,076, filed Apr. 27, 2006 reissue application now patented 6,450,584.

Corresponding U.S. Appl. No. 12/749,053, filed Mar. 29, 2010 published as 2010/0236069.

Shevket, Cengiz R., Handwritten note to Bill Sullivan of Continental-Teves Re: U222/8 Hub and Bearing Unit Proposal, Nov. 19, 1998.

Shevket, Cengiz R., SKF Comparison of Taper Unit Bearing with Respect to U222 Program Requirements, E-mail, Jul. 17, 1998.

\* cited by examiner

WHEEL ASSEMBLY AND METHOD FOR MAKING SAME

CROSS-REFERENCE TO RELATED APPLICATION

This application claims the benefit of priority of U.S. Provisional Patent Application Ser. No. 61/208,102, filed on Feb. 20, 2009, which is hereby incorporated by reference in its entirety.

FIELD OF THE INVENTION

The present invention relates generally to an apparatus and a method for reducing lateral run-out of a wheel-hub assembly and, more specifically, a method and an apparatus for machining the rotor-mounting flange surface of the hub.

BACKGROUND OF THE INVENTION

A typical automotive vehicle is equipped with disc brake systems for the purpose of stopping the vehicle. These disc brake systems are located at the front axle wheel assemblies and/or at the rear wheel assembly. Each wheel assembly typically includes a wheel hub, a rotor and a bearing. The bearing may further engage a knuckle that in turn may be connected to the vehicle. The disc brake rotor is comprised of a circular metal disc having opposed braking surfaces that are clamped by the brake pads to exert a braking effect. The rotor is attached to a wheel hub.

Performance of the braking system is related to the dimensional characteristics of the rotor and the wheel hub surface abutting the rotor. Any run-out variation in the wheel hub surface will cause lateral run-out or lateral deflection in the rotor. Lateral disc run-out refers to a lateral deviation of the planar surface of a rotor along a plane perpendicular to the longitudinal axis of rotation of the rotor. Because the rotor is designed to operate in a precise plane normal to the axis of the wheel, even slight run-out variations of the wheel hub is problematic. Similarly, the radial run-out of the outer edges of the braking surfaces need to be controlled to ensure that the brake pads engage as much of the available rotor-braking surface as possible without overlapping the edges of the rotor. If run-out is not controlled it can cause premature failure of the brake lining due to uneven wear which requires premature replacement of the brake lining at an increased expense. Further, problems due to run-out include, brake judder, steering wheel "nibble" and pedal pulses felt by the user, and warped rotors which result in brake noise and uneven stopping. However, manufacturers have faced difficulties in achieving enhanced control over these tolerances due to the influence of several factors.

One factor that frequently contributes to lateral run-out is variation in the processes that are used to machine the flange surface of the wheel hub. For example, the outer and inner flange surfaces of the wheel hub may be individually machined causing uneven deviation of the planar surface of the wheel hub.

Another factor that contributes to run-out is the stack-up of the individual components in a wheel assembly, i.e., their combined tolerances. While the tolerances of each part can be reduced when they are separately machined, when the parts are assembled, the combined tolerances stack up, causing run-out that is still relatively significant. Tolerance stacking may also be caused by variation in the turning processes that are used to machine the flange surface, when the wheel hub is individually machined, in an effort to make it flat with respect to the rotor. Further, the installation and press condition of the wheel bolts, the assembly process of the wheel assembly, and improperly pre-loaded bearings, can all cause misalignment of the hub surface with respect to the rotor and thus cause unacceptable run-out.

Lateral run-out may also be caused by the insertion and/or press-fitting of the wheel bolts to the flange after the flange surface of the wheel hub has been finished or machined. When the wheel bolts are press-fitted or tightened to the flange surface, the force causes the peripheral areas immediately around the wheel bolts to deform on the flange surface. Consequently, this deformation causes the surface of the flange to deform and deviate from the necessary planar surface of the wheel hub, causing lateral run-out.

The process of pressing or assembling the hub to the bearing is another possible factor that causes lateral run out. When the bearing is assembled to the hub, additional run-out variation may be introduced to the rotor mounting face of the hub. Additionally, removal of the bearing and/or reassembling the bearing to the wheel hub after machining the wheel hub can re-introduce lateral run-out variation.

Therefore, a need exists for an apparatus and a method for machining the wheel hub to eliminate the lateral run-out after the wheel bolts or bearing have been attached and to evenly machine the flange surface without significantly increasing the manufacturing cost of the assembly or increasing manufacturing difficulty.

SUMMARY OF THE PRESENT INVENTION

The present invention provides an apparatus and a method for manufacturing a wheel hub to reduce lateral run-out. Specifically, a wheel hub having a flange portion with an outer flange surface and an inner flange surface is provided. A plurality of wheel bolts are connected to the wheel hub, and the wheel hub is connected to a bearing. A grind wheel is then applied to the inner flange surface and outer flange surface to minimize run-out of the flange portion. The grind wheel includes a channel configured to allow clearance of the wheel bolts during rotation of the grind wheel.

BRIEF DESCRIPTION OF THE DRAWINGS

Objects and advantages together with the operation of the invention may be better understood by reference to the following detailed description taken in connection with the following illustrations, wherein.

DETAILED DESCRIPTION OF THE INVENTION

Figure 1:
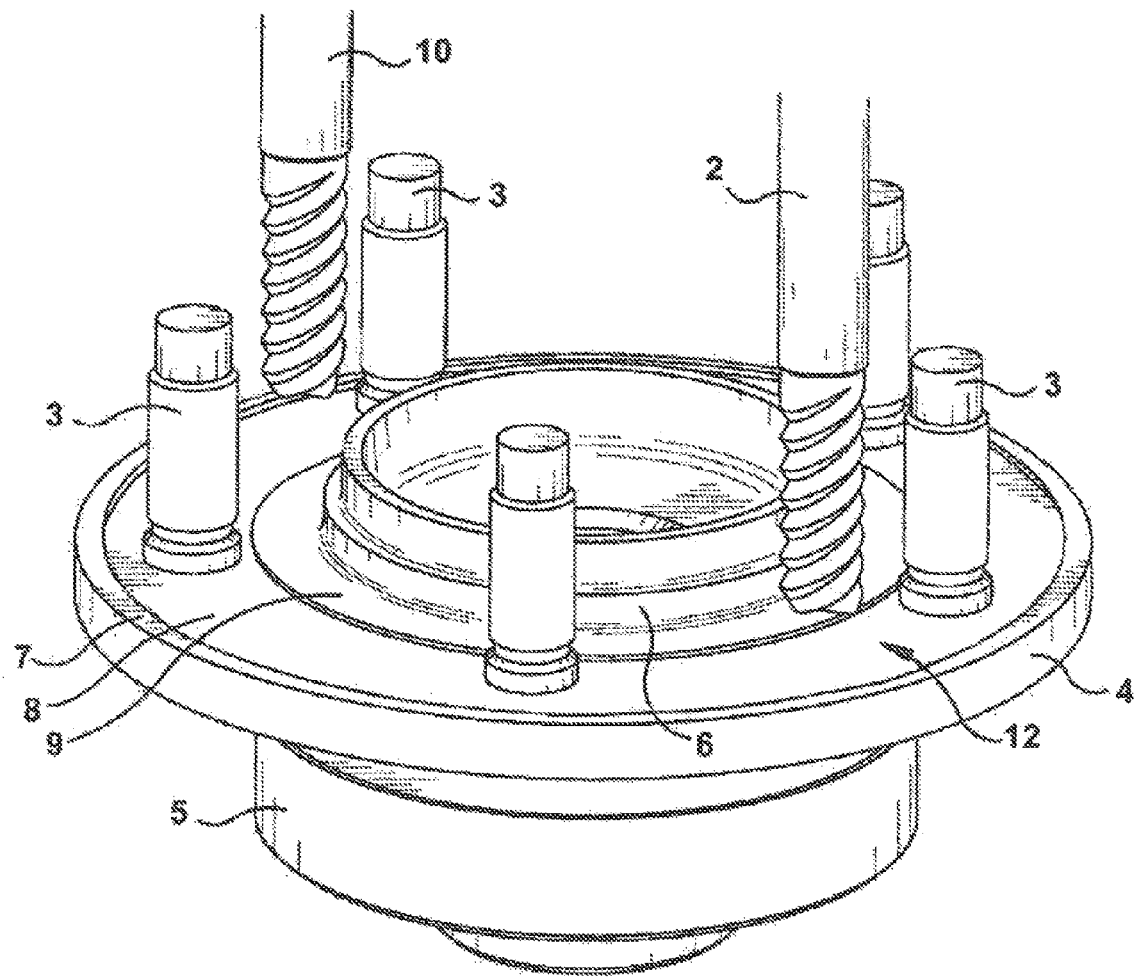
FIG. 1 is a perspective view of a portion of a wheel hub assembly engaged with a mill cutter.
Figure 2:
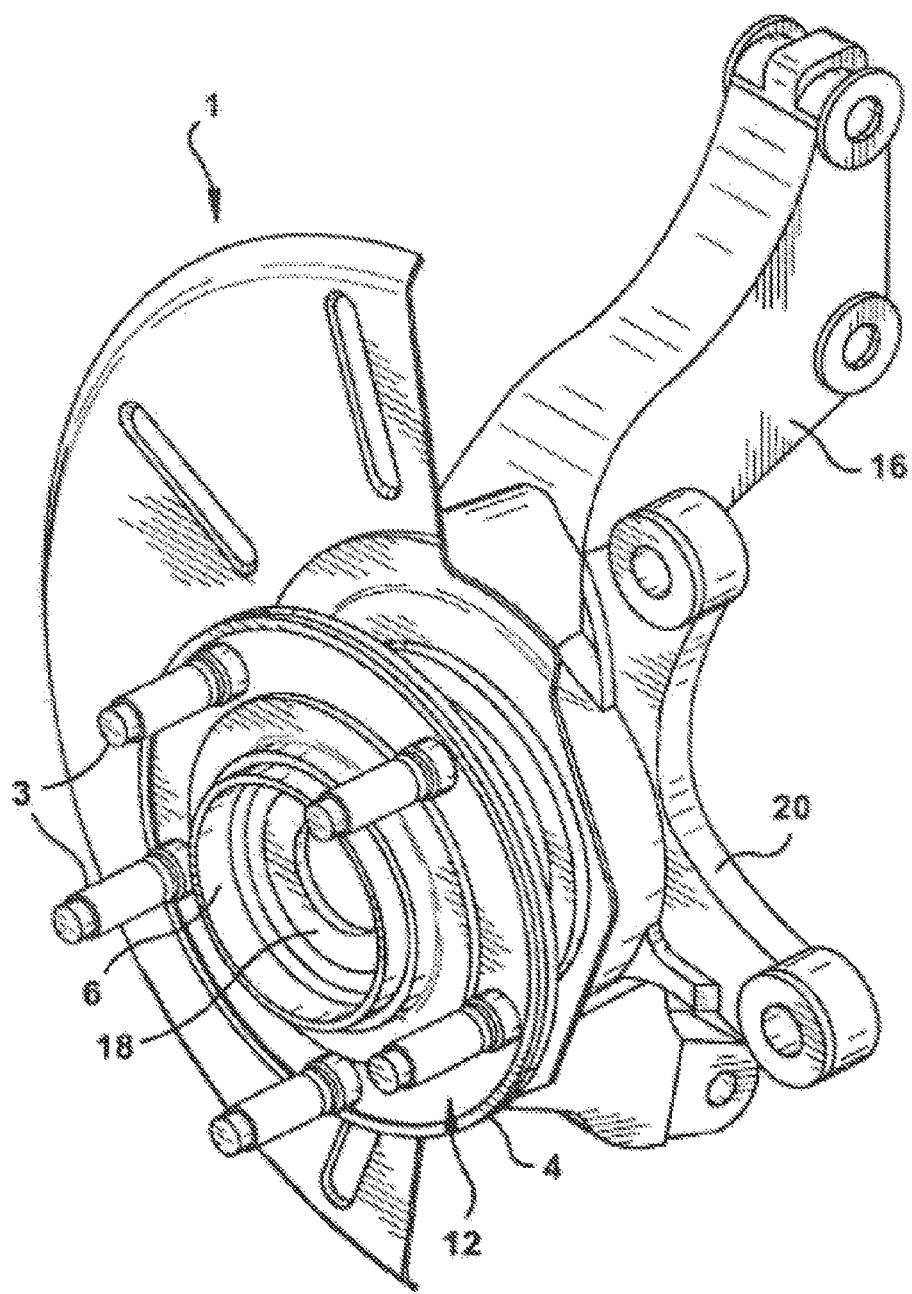
FIG. 2 is a perspective view of a wheel hub assembly including a knuckle.

FIGS. 1 and 2 illustrate a wheel hub assembly 1. The assembly 1 may include a variety of components, including a wheel hub 4, bearing 5, and knuckle 16. The wheel hub 4 may have a flange face 12 and a pilot portion 6. The pilot portion 6 extends generally outward from the flange face 12 so as to allow a rotor to be guided and affixed to the wheel hub assembly as known to one of ordinary skill in the art.

The knuckle 16 may have a generally circular bore 18 formed therein and a plurality of outwardly extending appendages or legs 20 that are capable of attachment to the vehicle through a plurality of apertures formed in the plurality of legs 20, as is known in the art.

The bearing 5 may be press-fit into the bore 18 of the knuckle 16. However, it should be understood that a variety of different knuckle/bearing attachment configurations may be utilized. For example, the bearing 5 may be press-fit with or without a snap ring, or may be held in place with a nut, or secured by other methods known in the art. Alternatively, a portion of the bearing 5 may be bolted to the knuckle 16 or integrally formed with the knuckle 16. Moreover, an inner portion of the bearing 5 may be integrally formed with the wheel hub.

A plurality of respective wheel bolts 3 may be attachable to the wheel hub 4. In an embodiment, the wheel bolts 3 are attached to the flange face 12 in a predetermined pattern, such as equidistantly spaced, and on the same pitch circle diameter. The wheel bolts 3 are oriented with the threaded ends extending outwardly so as to connect a rotor and an associated wheel onto the wheel hub 4 as commonly known in the skill of the art. The flange face 12 may have a relief channel 8 machined therein. The relief channel 8 may divide the flange face 12 into an outer flange surface 7 and an inner flange surface 9. In an embodiment, the relief channel 8 is turned into the flange face 12 so that the plurality of the wheel bolts 3 are positioned in the relief channel 8.

The wheel hub 4 may be positioned on the bearing 5. The bearing 5 is not limited to being positioned as illustrated in the figures and may, for example, secure about and/or attach about the inside diameter of the wheel hub 4, the outside diameter of the wheel hub 4 and/or therebetween. The bearing 5 may be any bearing type as known to one of ordinary skill in the art, including but not limited to a single row, a double row, a ball, a roller and/or the like. The bearing 5 may be integrated with the wheel hub 4. In an embodiment, the bearing 5 is used in the final wheel assembly 1 such that the bearing 5 is not detached from and/or reassembled with the wheel hub 4. To this end, the bearing 5 is used in the wheel assembly 1 that is attachable and/or securable to and/or secured to, for example, a vehicle.

Removal of the bearing 5 after machining the flange face 12 may cause lateral run-out of the wheel hub 4. Advantageously, the present invention provides an apparatus and a method for machining the flange face 12 after the bearing 5 is attached to and/or integrated with the wheel hub 4. The wheel hub 4 may be secured to the bearing 5 so that the wheel hub 4 can rotate with respect to the bearing 5. Alternatively, the wheel hub 4 and bearing 5 may rotate with respect to the knuckle 16. The wheel hub 4 may be affixed or mounted onto the bearing 5 in a variety of wheel hub/bearing configurations as known to one of ordinary skill in the art.

In operation, the wheel hub assembly 1 is machined to flatten the outer flange surface 7 and the inner flange surface 9 that will contact a rotor, and thus minimize any lateral run-out. The machining process flattens the inner flange surface 9 and the outer flange surface 7 such that surfaces 7, 9 are parallel with respect to each other. In an embodiment, the machining process finishes the flange surfaces 7, 9 such that the flange surfaces 7, 9 are co-planar. As is further discussed below, either the mill cutting process or alternatively, the use of grind wheel process accomplishes the machining of the flange face 12. Both processes, however, may occur after the wheel bolts 3 and/or the bearing 5 are attached or secured to the wheel hub 4.

Figure 3:
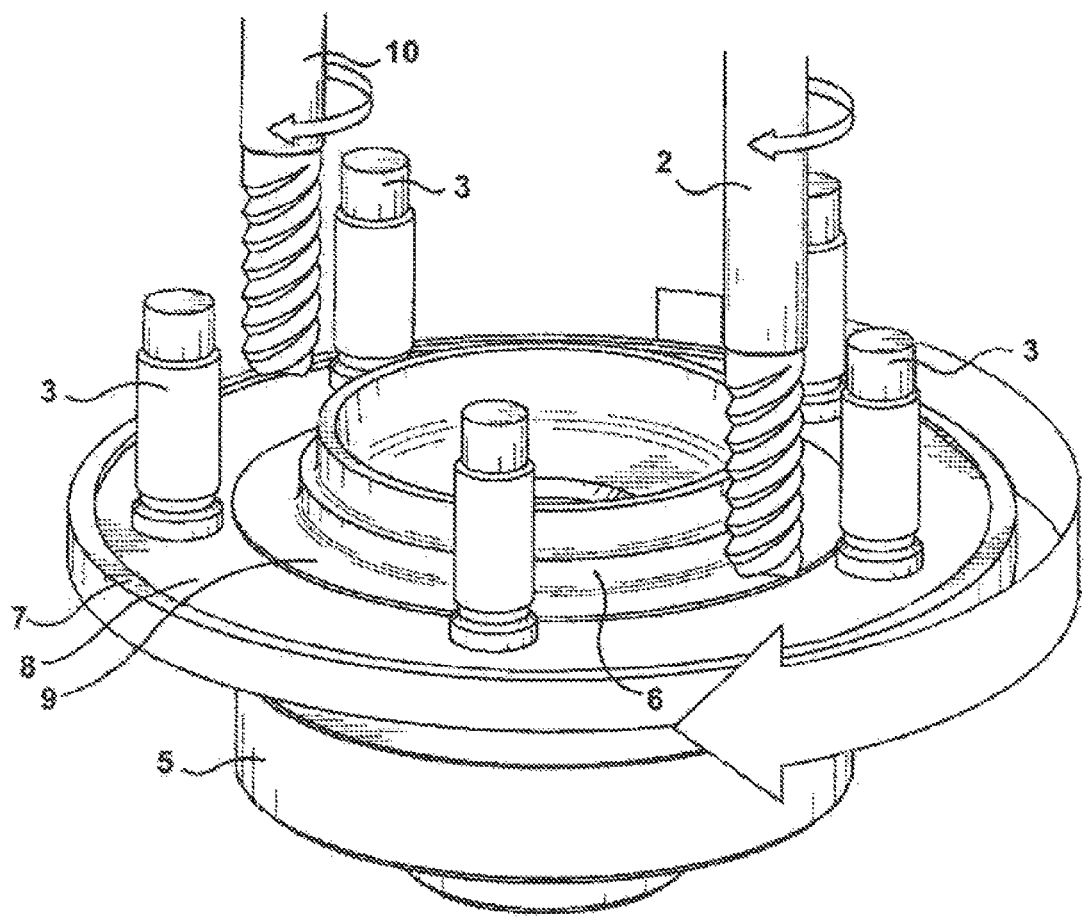
FIG. 3 is a perspective view of a portion of a wheel hub assembly engaged with a mill cutter.
Figure 5:
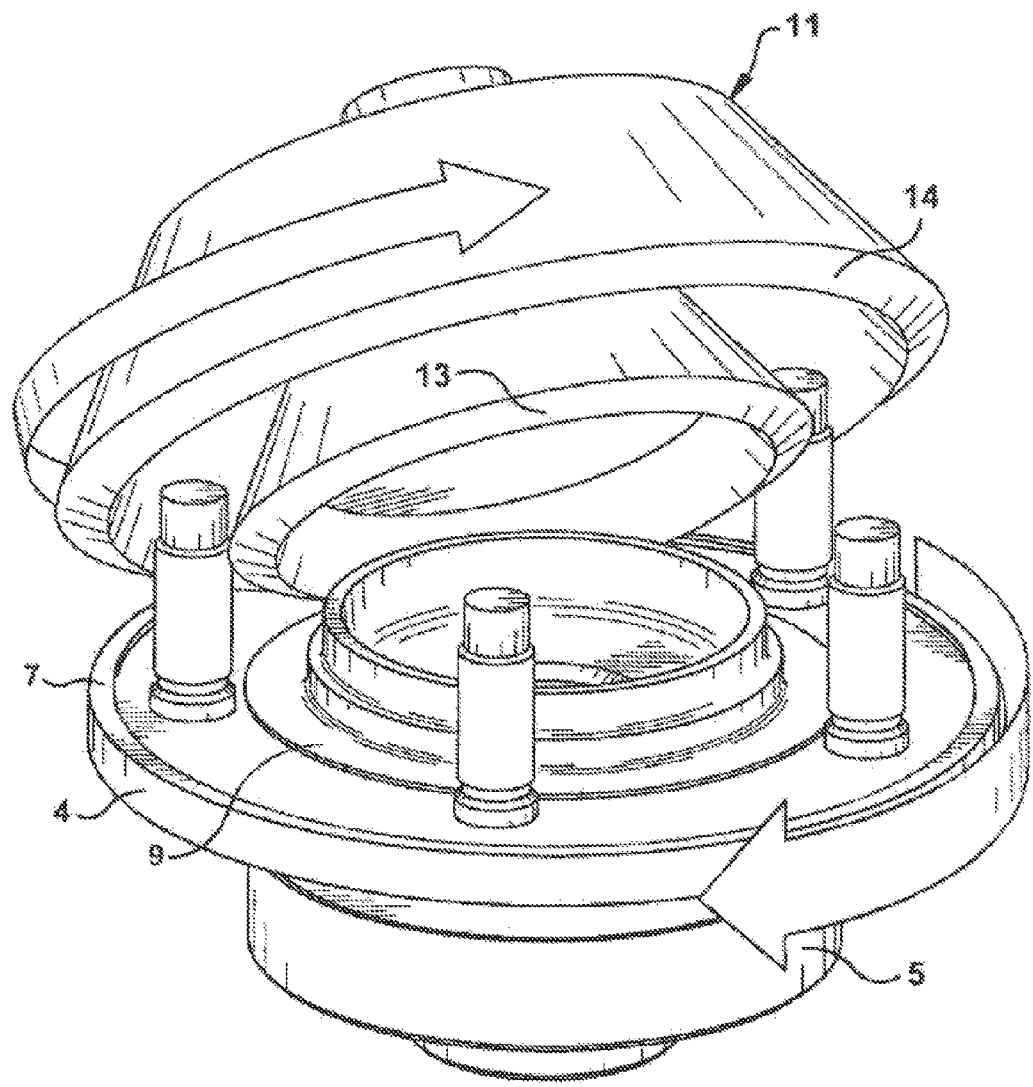
FIG. 5 is a perspective view of a portion of a wheel hub assembly engaged with a grind wheel.

FIGS. 3 and 5 illustrate rotational directions for certain components of the wheel hub assembly and components used for the finishing thereof. It will be appreciated that the rotational direction of each component is not limited to the direction of rotation illustrated. Rather, each denoted components may rotate in any direction as required.

FIG. 3 illustrates a milling process for the flange face 12 and wheel hub assembly 1. The wheel hub 4 is situated on the bearing 5, allowing the wheel hub 4 to rotate about an axis determined by the bearing 5. The wheel hub 4 is positioned on the bearing 5 so as to allow the flange face 12 to engage an inner mill cutter 2 and an outer mill cutter 10 protruding from a machine, such as a lathe. In one embodiment, the inner mill cutter 2 and the outer mill cutter 10 are stationary and each consists of a cutting end, but individually rotate about an axis determined by the tool and it's bearing. The cutting end of the inner mill cutter 2 engages the inner flange surface 9 of the flange face 12. The cutting end of the outer mill cutter 10 engages the outer flange surface 7 of the flange face 12. Alternatively, one of the mill cutters 2, 10 may be used to machine the inner flange surface 9 and/or the outer flange surface 7.

The milling process may occur as the wheel hub 4 rotates on the bearing 5 in a clockwise motion. In a preferred embodiment, the mill cutters 2, 10 move from a storage position and engage the flange surfaces 7, 9 as described above. The outer mill cutter 10 and/or the inner mill cutter 2 moves radially in and out as the hub wheel 4 turns, milling and finishing the flange surfaces 7, 9. This process of finishing reduces lateral run-out.

Figure 4:
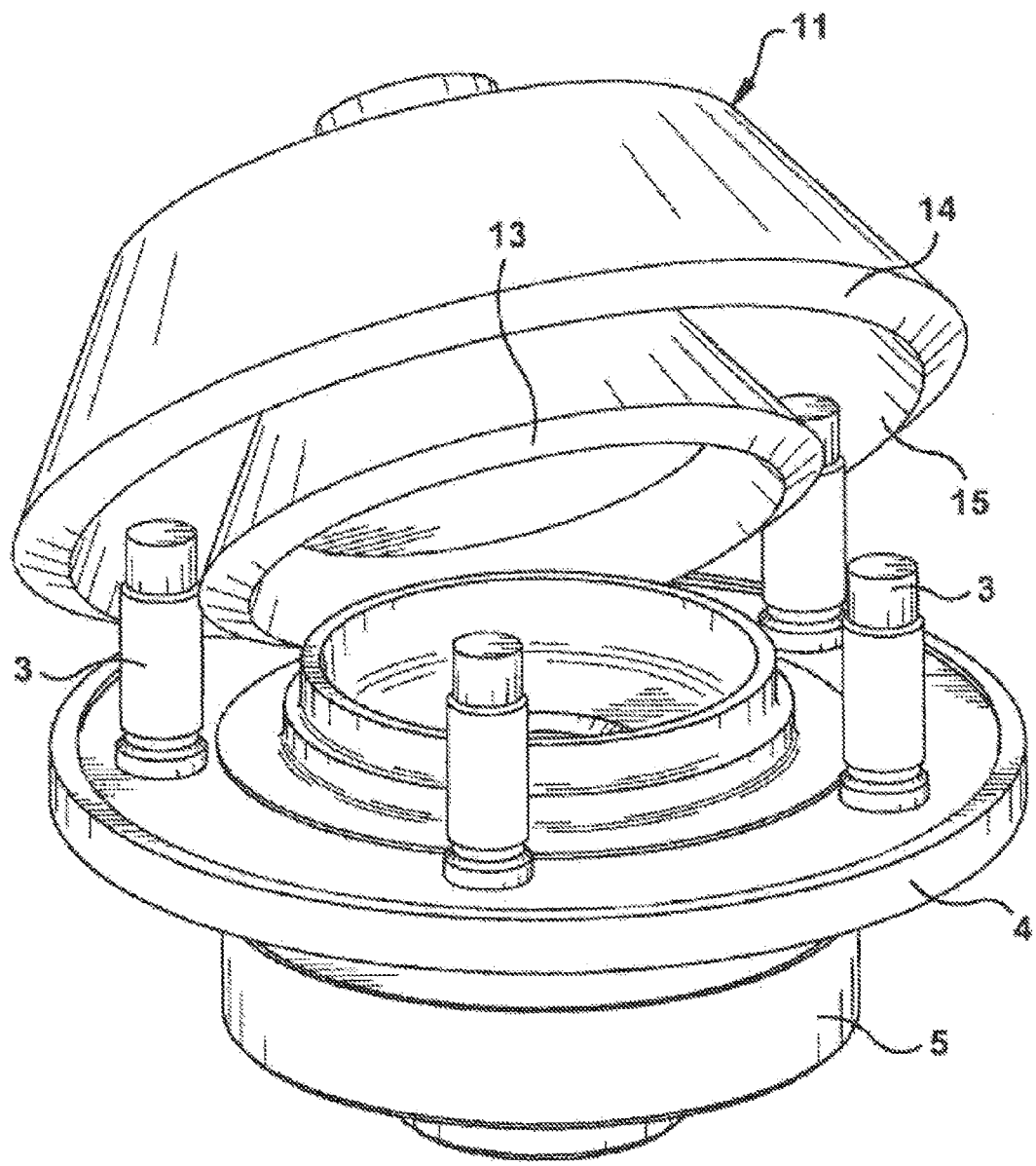
FIG. 4 is a perspective view of a portion of a wheel hub assembly engaged with a grind wheel.
Figure 6:
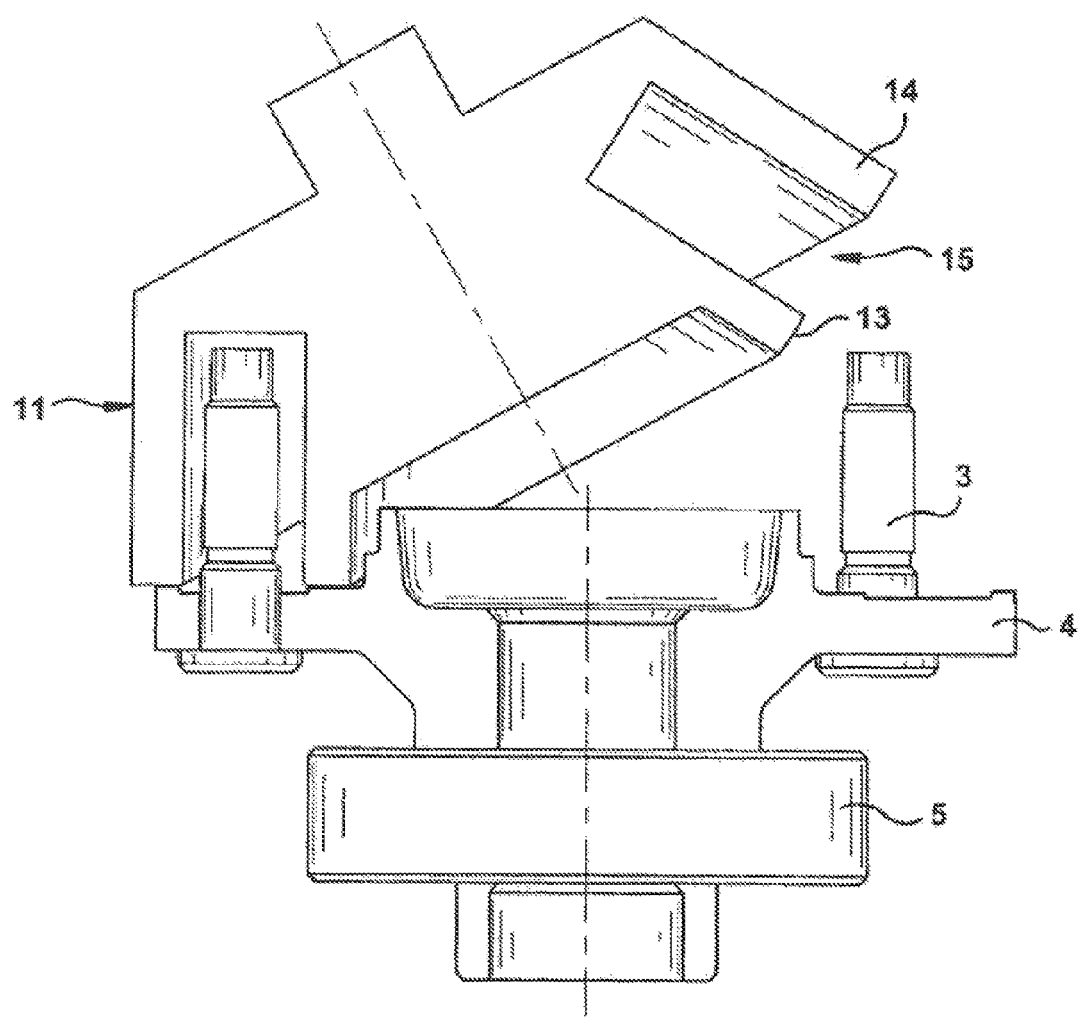
FIG. 6 is a cross-sectional view of a portion of a wheel hub assembly engaged with a grind wheel.

As shown FIG. 4-6, an alternate embodiment for refinishing the flange face 12 is a grinding process. The grinding process involves use of a grind wheel 11. The grind wheel 11 may be constructed from an abrasive material that may be, for example, boron, diamond, or any other abrasive and immalleable material known to one of ordinary skill of the art. In an embodiment, the grind wheel 11 is a singular cylindrical apparatus that may consist of an inner lip 13 and an outer lip 14. In one embodiment, the inner lip 13 has a shape that corresponds with the inner flange surface 9. Similarly, in an embodiment, the outer lip 14 and the outer flange surface 7 have corresponding shapes. Located in between the inner lip 13 and outer lip 14 is a channel 15. The channel 15 and the relief channel 8 also have corresponding shapes. As described below, the purpose of the channel 15 is to allow the wheel bolts 3 of the wheel hub 4 to pass or clear within the grind wheel 11 while the grind wheel 11 engages and finishes the flange surfaces 7, 9. While the grind wheel 11 is described as having both an inner lip and outer lip, it will be appreciated that other configurations may be used. For example, the grind wheel 11 may comprise a single lip configured to engage either the outer flange surface 7 or the inner flange surface 9.

The grind wheel 11 serves as a machining apparatus for the purpose of finishing the flange face 12. Referencing FIG. 6, the open face of grind wheel 11 is placed on the top of the wheel hub 4 so that the grind wheel 11 engages flange face 12. The inner lip 13 is aligned along the inner flange surface 9. The outer lip 14 is aligned along the outer flange surface 7. This arrangement allows the outer lip 14 to cup the wheel bolts 3 so that the wheel bolts 3 terminate within the channel 15 of the grind wheel 11.

FIGS. 5 and 6 illustrate the grinding process of the present invention. The grind wheel 11 is placed on top of the wheel hub 4 as described above. As the wheel hub 4 rotates in a clockwise direction about the axis of the bearing 5, the grind wheel 11 is rotated in the counterclockwise direction. The rotations of the wheel hub 4 and the grind wheel 11 are not limited to clockwise and counterclockwise rotations respectively, but, preferably are in opposite directions as known to one of ordinary skill of the art. The inner flange surface 9 and outer flange surface 7 are finished by the friction created against the inner lip 13 and outer lip 14 of the grind wheel. In an embodiment, the grind wheel 11 rotates at a higher rate of speed than the wheel hub 4 and in an opposite direction with respect to the wheel hub 4. The engagement of the grind wheel 11 upon the flange surfaces 7, 9 causes a high degree of friction that removes material from the flange surfaces 7, 9 and creates the flattening and finishing process of the flange face 12, thereby reducing lateral run-out. As illustrated in FIGS. 5 and 6, the rotational axis of the bearing 5 and the rotational axis of the of the grind wheel 11 are not coaxial during the grinding process, e.g., while grinding the inner and outer flange surfaces 7, 9. For example, while the grind wheel 11 is rotating, the rotational axis of the grind wheel 11 may be angled relative to the axis of rotation of the bearing 5. Preferably, the rotational axis of the grind wheel 11 is angled away from the rotational axis of the bearing 5, in the direction from the bearing 5 to the grind wheel 11. The lips 13, 14 of the grind wheel have surfaces that are grinding surfaces that form an acute angle with the plane normal to the axis of rotation of the grind wheel 11. The portion of the surfaces of the lips 13, 14 that contact with an inner or outer flange surface for grinding the flange surfaces are preferably oriented perpendicular to the axis of rotation of the bearing 5. As illustrated in FIGS. 5 and 6, a grinding surface of a lip 13, 14 may have a width and a circumference. During the grinding process, preferably a first portion of the grinding surface of the lip 13, 14 contacts a flange surface 7, 9 along the width of the lip and a second portion of the lip is located above the flange surface 7, 9 and has no contact with the flange surface along the width of the lip. During the grinding process, the number of bolts having a length entirely in the annular channel at any moment preferably is one or less, such as illustrated in FIGS. 5 and 6.

Other objects and features of the present invention will become apparent when reviewed in light of detailed description of the preferred embodiment when taken in conjunction with the attached drawings and appended claims

Having thus described the invention, I claim:

1. A method of manufacturing a wheel assembly comprising:
    providing a wheel hub having a flange portion with an outer flange surface and an inner flange surface;
    securing a plurality of wheel bolts to said flange portion;
    connecting a bearing to said wheel hub; and
    applying a grind wheel to said inner flange surface and said outer flange surface of said wheel assembly to reduce lateral run-out,
    wherein said grind wheel includes one annular channel between an inner lip and an outer lip that is configured to allow clearance of said wheel bolts upon rotation of said grind wheel;
    wherein an axis of rotation of the wheel hub and an axis of rotation of the grind wheel are angled during the step of applying the grind wheel to the inner and outer flange portions; during a step of grinding, a number of the wheel bolts having a length entirely in the annular channel at any moment is one or less; and
    wherein the step of applying a grinding wheel after the step of securing the wheel bolts.

2. The method of claim 1 further comprising connecting said bearing to a knuckle.

3. The method of claim 1 wherein said wheel hub is rotatable with respect to said bearing.

4. The method of claim 1 wherein grinding includes rotating said grind wheel in a first direction with respect to said wheel assembly.

5. The method of claim 4 further comprising the step of rotating said wheel assembly in a second direction opposite said first direction with respect to said grind wheel.

6. The method of claim 1 wherein said flange portion includes a relief channel located between said outer flange surface and said inner flange surface.

7. The method of claim 1, wherein the method includes a step of rotating the grinding wheel in a first direction and rotating the wheel assembly in a second direction that is opposite the first direction, and
    wherein the one annular channel is configured so that the grinding wheel rotates continuously in the first direction around the plurality of wheel bolts.

8. The method of claim 1, wherein during the step of applying the grind wheel, the number of bolts having a length entirely in, the annular channel at any moment is one or less.

9. A method of manufacturing a wheel assembly comprising:
    providing a wheel hub having a flange portion with an outer flange surface and an inner flange surface, wherein the wheel hub has a first axis of rotation;
    securing a plurality of wheel bolts to said flange portion of said wheel hub;
    connecting a bearing to said wheel hub;
    connecting a knuckle to said bearing;
    applying a grind wheel to said flange portion, the grind wheel having a second axis of rotation and including an outer lip to engage said outer flange surface, an inner lip to engage said inner flange surface, and a circumferential channel in the grind wheel between said outer lip and said inner lip that allows clearance of said wheel bolts upon rotation of said grind wheel so that said wheel bolts pass through said channel during continuous rotation of said grinding wheel in a single direction;
    rotating said grind wheel in a first direction with respect to said wheel assembly to reduce lateral run-out, wherein during the step of rotating the grind wheel, the second axis of rotation is angled relative to the first axis of rotation; during a step of grinding, a number of the wheel bolts having a length entirely in the annular channel at any moment is one or less; and
    wherein the grind wheel is an annular grind wheel, and wherein the step of applying a grinding wheel is after the step of securing the wheel bolts.

10. The method of claim 9 wherein further comprising rotating the wheel assembly in a second direction opposite said first direction with respect to said grind wheel.

11. The method of claim 9 wherein said grind wheel is constructed of boron.

12. The method of claim 9 wherein said wheel hub includes a relief channel arranged between said inner flange surface and said outer flange surface.

13. The method of claim 12, wherein the channel allows the wheel bolts of the wheel hub to pass and clear within the grind wheel while the grind wheel engages and finishes the inner flange surface and the outer flange surface.

14. The method of claim 9 wherein said wheel hub includes a pilot portion extending generally outward from said flange portion.

15. The method of claim 9 wherein rotation of said grind wheel finishes said outer flange said inner flange to be substantially co-planar.

16. The method of claim 9 wherein said bearing is press fit into said knuckle.

17. The method of claim 9, wherein during the step of applying the grind wheel, the number of bolts having a length entirely in the annular channel at any moment is one or less.

18. A method of manufacturing a wheel assembly comprising:
- providing a wheel hub having a flange portion including an outer flange surface, an inner flange surface, or both;
- securing a plurality of wheel bolts to the flange portion;
- connecting a bearing to the wheel hub; and
- applying a grind wheel to the inner flange surface, the outer flange surface, or both,
- wherein the grind wheel includes one or more lips having a surface for contacting the inner flange surface, the outer flange surface or both,
- wherein the grind wheel has an axis of rotation and the surface of the one or more lips is a grinding surfaces angled relative to the plane normal to the axis of rotation of the grind wheel during a step of grinding, a number of the wheel bolts having a length entirely in the annular channel at any moment is one or less.

19. The method of claim 18, wherein the lip has a width and a circumference, wherein during the step of applying the grind wheel to the inner or outer flange surface, a first portion of the lip contacts the flange surface along the width of the lip and a second portion of the lip is located above the flange surface and has no contact with the flange surface along the width of the lip.

20. The method of claim 18, wherein the wheel hub and bearing rotate about a rotation of axis that is outwardly angled relative to the axis of rotation of the grind wheel in the direction from the bearing to the grind wheel.

* * * * *

UNITED STATES PATENT AND TRADEMARK OFFICE
CERTIFICATE OF CORRECTION

PATENT NO. : 9,120,195 B2  
APPLICATION NO. : 12/709986  
DATED : September 1, 2015  
INVENTOR(S) : Robert Veldman Page 1 of 1

It is certified that error appears in the above-identified patent and that said Letters Patent is hereby corrected as shown below:

In the Claims

Column 5, Line 64, Claim 5, after "wheel" please add "is"

Signed and Sealed this
Ninth Day of February, 2016

Michelle K. Lee
*Director of the United States Patent and Trademark Office*